US010003955B2

(12) United States Patent
Diachina et al.

(10) Patent No.: US 10,003,955 B2
(45) Date of Patent: Jun. 19, 2018

(54) WIRELESS DEVICE DETERMINATION THAT CONDITIONS ARE FULLFILLED PRIOR TO UTILIZING MOBILITY HISTORY LIST

(71) Applicant: TELEFONAKTIEBOLAGET LM ERICSSON (PUBL), Stockholm (SE)

(72) Inventors: John Walter Diachina, Garner, NC (US); Paul Schliwa-Bertling, Ljungsbro (SE); Jens Bergqvist, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 15/159,439

(22) Filed: May 19, 2016

(65) Prior Publication Data

US 2016/0345160 A1 Nov. 24, 2016

Related U.S. Application Data

(60) Provisional application No. 62/163,889, filed on May 19, 2015.

(51) Int. Cl.
*H04W 8/08* (2009.01)
*H04W 8/00* (2009.01)
*H04W 4/00* (2018.01)
*H04W 48/16* (2009.01)

(52) U.S. Cl.
CPC ............. *H04W 8/08* (2013.01); *H04W 4/005* (2013.01); *H04W 8/00* (2013.01); *H04W 48/16* (2013.01)

(58) Field of Classification Search
CPC ..... H04W 4/028; H04W 48/16; H04W 24/10; H04W 28/02; H04W 28/0215; H04W 28/12; H04W 8/02; H04W 8/08; H04W 4/005; H04W 8/00
See application file for complete search history.

(56) References Cited

U.S. PATENT DOCUMENTS

| | | | | |
|---|---|---|---|---|
| 2011/0098051 A1* | 4/2011 | Kamalaraj | ............ | H04W 24/00 455/450 |
| 2012/0184287 A1* | 7/2012 | Jovicic | .................. | G01S 5/0009 455/456.1 |
| 2012/0270556 A1* | 10/2012 | Yin | ....................... | H04W 68/04 455/450 |

OTHER PUBLICATIONS

Ericsson LM: "Cellular IoT, Mobility Management", 3GPP Draft; 3GPP TSG GERAN#66, Tdoc GP-150455, Agenda item 7.2.5.3.4, Vilnius, Lithuania, May 25-29, 2015; 4. Mobility History List.
Ericsson LM: "Cellular IoT, Mobility Management", 3GPP TSG GERAN FS_IoT LC Adhoc#2, Tdoc GPC150207, Agenda item 2.4.3, Sophia Antipolis, France, Apr. 20-23, 2015, the whole document.
Ericsson LM: "Pseudo CR 45.820—Cellular IoT, Mobility Management", 3GPP TSG GERAN FS_IoT_LC Adhoc#2, Tdoc GPC150208, Agenda item 2.4.3, Sophia Antipolis, Apr. 20-23, 2015, paragraph [6.2.5.4.2].

(Continued)

Primary Examiner — Daniel Lai

(57) ABSTRACT

A core network node (e.g., Serving GPRS Support Node (SGSN)), a radio access network node (e.g., Base Station Subsystem (BSS)), a wireless device (e.g., mobile station, Internet of Things (IoT) device), and various methods are described herein which are related to the wireless device needing to determine that certain conditions are fulfilled prior to utilizing a mobility history list.

8 Claims, 6 Drawing Sheets

(56) References Cited

OTHER PUBLICATIONS

Ericsson: "Pseudo CR 45.820—EC-GSM, Cell selection and cell Reselection", 3GPP TSG GERAN Ad Hoc#2, GPC150214, Agenda item 1.4.2.1; 2.4.2.1; Sophia Antipolis, France, Apr. 20-24, 2015, paragraph [6.2.6.x.1.3], paragraph [6.2.6.x.3].
Ericsson: "EC-GSM Cell Selection and re-selection", 3GPPTSG GERAN Ad Hoc#2, Tdoc GPC150213, Agenda item 1.4.2.1; 2.4.2.1; Sophia Antipolis, France, Apr. 20-23, 2015, the whole document.
Wang L. et al.: "Novel MAP Selection Scheme Using Location History in Hierarchical MIPv6 Networks", Wireless Communications and Networking Conference, 2008; WCNC 2008; IEEE, IEEE, Piscataway, NJ, USA, Mar. 31, 2008, abstract, section II. Related Work (last two paragraphs on p. 2421).

\* cited by examiner

WIRELESS DEVICE DETERMINATION THAT CONDITIONS ARE FULLFILLED PRIOR TO UTILIZING MOBILITY HISTORY LIST

CLAIM OF PRIORITY

This application claims the benefit of priority to U.S. Provisional Application Ser. No. 62/163,889, filed on May 19, 2015, the entire contents of which are hereby incorporated herein by reference for all purposes.

TECHNICAL FIELD

The present disclosure relates generally to the wireless communications field and, more particularly, to a core network node (e.g., Serving GPRS Support Node (SGSN)), a radio access network node (e.g., Base Station Subsystem (BSS)), a wireless device (e.g., mobile station, Internet of Things (IoT) device), and various methods related to the wireless device needing to determine that certain conditions are fulfilled prior to utilizing a mobility history list

BACKGROUND

The following abbreviations and terms are herewith defined, at least some of which are referred to within the following description of the present disclosure.
3GPP 3rd-Generation Partnership Project
AGCH Access Grant Channel
ASIC Application Specific Integrated Circuit
BLER Block Error Rate
BSS Base Station Subsystem
CC Coverage Class
CN Core Network
DRX Discontinuous Receive Cycle
EC-GSM Extended Coverage Global System for Mobile Communications
EC-PCH Extended Coverage Paging Channel
eDRX Extended Discontinuous Receive
eNB Evolved Node B
DL Downlink
DSP Digital Signal Processor
EDGE Enhanced Data rates for GSM Evolution
EGPRS Enhanced General Packet Radio Service
GSM Global System for Mobile Communications
GERAN GSM/EDGE Radio Access Network
GPRS General Packet Radio Service
HARQ Hybrid Automatic Repeat Request
IMSI International Mobile Subscriber Identity
IoT Internet of Things
LTE Long-Term Evolution
MCS Modulation and Coding Scheme
MME Mobility Management Entity
MS Mobile Station
MTC Machine Type Communications
NB Node B
PCH Paging Channel
PDN Packet Data Network
PDTCH Packet Data Traffic Channel
PDU Protocol Data Unit
PLMN Public Land Mobile Network
RACH Random Access Channel
RAN Radio Access Network
RAT Radio Access Technology
RAU Routing Area Update
SGSN Serving GPRS Support Node
TDMA Time Division Multiple Access
TS Technical Specifications
UE User Equipment
WCDMA Wideband Code Division Multiple Access
WiMAX Worldwide Interoperability for Microwave Access
Coverage Class (CC): At any point in time a wireless device belongs to a specific uplink/downlink coverage class that corresponds to either the legacy radio interface performance attributes that serve as the reference coverage for legacy cell planning (e.g., a Block Error Rate of 10% after a single radio block transmission on the PDTCH) or a range of radio interface performance attributes degraded compared to the reference coverage (e.g., up to 20 dB lower performance than that of the reference coverage). Coverage class determines the total number of blind transmissions to be used when transmitting/receiving radio blocks. An uplink/downlink coverage class applicable at any point in time can differ between different logical channels. Upon initiating a system access a wireless device determines the uplink/downlink coverage class applicable to the RACH/AGCH based on estimating the number of blind transmissions of a radio block needed by the BSS (radio access network node) receiver/wireless device receiver to experience a BLER (block error rate) of approximately 10%. The BSS determines the uplink/downlink coverage class to be used by a wireless device on the assigned packet channel resources based on estimating the number of blind transmissions of a radio block needed to satisfy a target BLER and considering the number of HARQ retransmissions (of a radio block) that will, on average, be needed for successful reception of a radio block using that target BLER. Note: a wireless device operating with radio interface performance attributes corresponding to the reference coverage (normal coverage) is considered to be in the best coverage class (i.e., coverage class 1) and therefore does not make any additional blind transmissions subsequent to an initial blind transmission. In this case, the wireless device may be referred to as a normal coverage wireless device. In contrast, a wireless device operating with radio interface performance attributes corresponding to an extended coverage (i.e., coverage class greater than 1) makes multiple blind transmissions. In this case, the wireless device may be referred to as an extended coverage wireless device. Multiple blind transmissions corresponds to the case where N instances of a radio block are transmitted consecutively using the applicable radio resources (e.g. the paging channel) without any attempt by the transmitting end to determine if the receiving end is able to successfully recover the radio block prior to all N transmissions. The transmitting end does this in attempt to help the receiving end realize a target BLER performance (e.g. target BLER≤10% for the paging channel).
eDRX cycle: eDiscontinuous reception (eDRX) is a process of a wireless device disabling its ability to receive when it does not expect to receive incoming messages and enabling its ability to receive during a period of reachability when it anticipates the possibility of message reception. For eDRX to operate, the network coordinates with the wireless device regarding when instances of reachability are to occur. The wireless device will therefore wake up and enable message reception only during pre-scheduled periods of reachability. This process reduces the power consumption which extends the battery life of the wireless device and is sometimes called (deep) sleep mode.
Extended Coverage: The general principle of extended coverage is that of using blind transmissions for the control channels and for the data channels to realize a target block error rate performance (BLER) for the channel of interest. In addition, for the data channels the use of blind transmissions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind transmissions are associated with each of the coverage classes wherein extended coverage is associated with coverage classes for which multiple blind transmissions are needed (i.e., a single blind transmission is considered as the reference coverage). The number of total blind transmissions for a given coverage class can differ between different logical channels.

Internet of Things (IoT) devices: The Internet of Things (IoT) is the network of physical objects or "things" embedded with electronics, software, sensors, and connectivity to enable objects to exchange data with the manufacturer, operator and/or other connected devices based on the infrastructure of the International Telecommunication Union's Global Standards Initiative. The Internet of Things allows objects to be sensed and controlled remotely across existing network infrastructure creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Experts estimate that the IoT will consist of almost 50 billion objects by 2020.

Cellular Internet of Things (CIoT) devices: CIoT devices are IoT devices that establish connectivity using cellular networks.

Nominal Paging Group: The specific set of EC-PCH blocks a device monitors once per eDRX cycle. The device determines this specific set of EC-PCH blocks using an algorithm that takes into account its IMSI, its eDRX cycle length and its downlink coverage class.

MTC device: A MTC device is a type of device where support for human interaction with the device is typically not required and data transmissions from or to the device are expected to be rather short (e.g., a maximum of a few hundred octets). MTC devices supporting a minimum functionality can be expected to only operate using normal cell contours and as such do not support the concept of extended coverage whereas MTC devices with enhanced capabilities may support extended coverage.

Work is currently ongoing within the 3GPP to specify a cellular radio access technology (RAT) which is dedicated to catering to the so-called Internet of Things (IoT) market. One study is ongoing in 3GPP GSM GERAN, but similar studies are also ongoing in 3GPP RAN for both Wideband Code Division Multiple Access (WCDMA) and Long-Term Evolution (LTE).

One important objective of these studies is to handle a vast number of Machine Type Communication (MTC) wireless devices where some of the MTC wireless devices (e.g., IoT devices, CIoT devices) might be situated in areas of extreme radio coverage. In addition, many of the MTC devices are considered to be stationary, i.e., the MTC devices are not moving around in the wireless communication network.

One of the candidate solutions proposed within the framework of the ongoing 3GPP GERAN study is the Extended Coverage Global System for Mobile Communications (EC-GSM) solution. In EC-GSM, the extended coverage is achieved via a repetition-based transmission scheme (i.e., blind transmission scheme) wherein N instances of a radio block are transmitted consecutively regardless of whether the receiving end is able to successfully recover the radio block prior to all N transmissions (i.e., a transmitter is said to blindly transmit a radio block if it does so without any concern about whether the receiver is able to receive the radio block prior to the Nth transmission).

Depending on the actual coverage for a wireless device (e.g., MS, UE, MTC wireless device, IoT device, CIoT device), a different number of repeated (blind) transmissions will be needed in order to successfully establish the needed connection and sustain ongoing data transmissions with the wireless device. Different coverage classes are therefore defined, where a coverage class (CC) of a wireless device indicates what radio coverage the wireless device is experiencing and, thus, how many blind transmissions would be needed to reach the wireless device according to a target BLER. The wireless devices which are within coverage that is in parity with what is supported by legacy General Packet Radio Service (GPRS) radio network systems are considered to be in normal coverage (Coverage Class 1 (CC1)).

An example of when specific measures are needed in order to achieve an extended coverage is when a paging message is to be transmitted to a wireless device. In order to successfully transmit the paging message to the wireless device with an acceptable BLER, in the cell in which the wireless device is located, and thus listening to its nominal paging group, the paging message is repeated a number of times corresponding to the coverage class (CC) of the wireless device.

Work is also ongoing within 3GPP to decrease the power consumption of a wireless device (e.g., MS, UE, MTC wireless device, IoT device, CIoT device). One mechanism to decrease the power consumption is to let the wireless device listen to the paging channel (e.g., for possible paging message reception) less frequently based on using an extended Discontinuous Receive (eDRX) cycle, with paging cycle lengths in the area of tens of minutes being discussed. The latency when trying to reach the wireless device is thus increased correspondingly. In case the paging procedure is not successful, e.g., due to paging message(s) being sent in cells where the targeted wireless device is not currently located, the paging capacity requirements will increase significantly as these paging messages will consume paging channel bandwidth while the targeted wireless device is not present to listen to these paging channels.

In order to limit the amount of radio resources used for paging, a mechanism (i.e., the mobility history mechanism) has been proposed to 3GPP whereby the network keeps track of the location of a wireless device in an area of a few cells. This is achieved by using a so-called mobility history list, which is a list of the cells last visited by the wireless device. The mobility history list is stored (maintained) both in the wireless device and in the network (e.g., a CN node such as an SGSN), and the list is updated by the wireless device performing a Cell Update every time the wireless device enters a cell that is not part of the mobility history list (i.e., a wireless device uses the Cell Update procedure to convey mobility history to the network). This enables the network to reach the wireless device with a paging message while only transmitting paging messages in a few cells and thereby dramatically reducing the demand for paging channel capacity.

One problem with the mobility history list mechanism is that a wireless device with high mobility will need to transmit many Cell Updates in order to keep the wireless device's list up to date. This will have a negative impact on the power consumption of the wireless device and the availability of packet channel resources in the serving wireless communication system.

A possible solution to this problem that has been proposed is for the network to deactivate the use of the mobility history list for a given wireless device when detecting that the wireless device is transmitting too many Cell Updates. However, this solution would allow for a wireless device with high mobility to first perform a number of Cell Updates prior to the determination that the mobility history list should not be used for that wireless device. In addition, this solution would be repeated every time the wireless device is restarted or if the wireless device enters an area of another network node, e.g., when performing a Routing Area Update (RAU). Accordingly, there is still a need to address the aforementioned shortcomings associated with the current mobility history list mechanism. This need and other needs are addressed by the present disclosure.

SUMMARY

A wireless device, a CN node (e.g., SGSN), a RAN node (e.g., BSS), and various methods for addressing the aforementioned shortcomings are described in the independent claims. Advantageous embodiments of the wireless device, the CN node (e.g., SGSN), the RAN node (e.g., BSS), and various methods are further described in the dependent claims.

In one aspect, the present disclosure provides a wireless device configured to interact with a RAN node and a CN node. The wireless device comprises a processor and a memory that stores processor-executable instructions, wherein the processor interfaces with the memory to execute the processor-executable instructions, whereby the wireless device is operable to perform an obtain operation, a determine operation, and a transmit operation. In the obtain operation, the wireless device obtains at least one threshold identifying when the wireless device qualifies to use a mobility history list. In the determine operation, the wireless device determines based on the at least one threshold whether the wireless device qualifies to use the mobility history list. In the transmit operation, the wireless device based on a determination that the wireless device is to use the mobility history list transmits a message including a list of one or more cells visited by the wireless device. An advantage of the wireless device implementing these operations is that it helps to reduce the paging-related signaling load in the network and reduce the demand for paging channel capacity on the radio interface while having a positive impact on the power consumption of the wireless device.

In another aspect, the present disclosure provides a method in a wireless device configured to interact with a RAN node and a CN node. The method comprises an obtaining step, a determining step, and a transmitting step. In the obtaining step, the wireless device obtains at least one threshold identifying when the wireless device qualifies to use a mobility history list. In the determining step, the wireless device determines based on the at least one threshold whether the wireless device is to use the mobility history list. In the transmitting step, the wireless device based on a determination that the wireless device qualifies to use the mobility history list transmits a message including a list of one or more cells visited by the wireless device. An advantage of the wireless device implementing these steps is that it helps to reduce the paging-related signaling load in the network and reduce the demand for paging channel capacity on the radio interface while having a positive impact on the power consumption of the wireless device.

In yet another aspect, the present disclosure provides a RAN node configured to interact with a wireless device and a CN node. The RAN comprises a processor and a memory that stores processor-executable instructions, wherein the processor interfaces with the memory to execute the processor-executable instructions, whereby the RAN node is operable to transmit, to the wireless device, at least one threshold identifying when the wireless device qualifies to use a mobility history list. An advantage of the RAN node implementing this operation is that it helps to reduce the paging-related signaling load in the network and reduce the demand for paging channel capacity on the radio interface while having a positive impact on the power consumption of the wireless device.

In still yet another aspect, the present disclosure provides a method in a RAN node configured to interact with a wireless device and a CN node. The method comprises a step of transmitting, to the wireless device, at least one threshold identifying when the wireless device qualifies to use a mobility history list. An advantage of the RAN node implementing this step is that it helps to reduce the paging-related signaling load in the network and reduce the demand for paging channel capacity on the radio interface while having a positive impact on the power consumption of the wireless device.

In another aspect, the present disclosure provides a CN node configured to interact with a wireless device and a RAN node. The CN node comprises a processor and a memory that stores processor-executable instructions, wherein the processor interfaces with the memory to execute the processor-executable instructions, whereby the CN node is operable to transmit, to the wireless device, at least one threshold identifying when the wireless device qualifies to use a mobility history list. An advantage of the CN node implementing this operation is that it helps to reduce the paging-related signaling load in the network and reduce the demand for paging channel capacity on the radio interface while having a positive impact on the power consumption of the wireless device.

In still yet another aspect, the present disclosure provides a method in a CN node configured to interact with a wireless device and a RAN node. The method comprises a step of transmitting, to the wireless device, at least one threshold identifying when the wireless device qualifies to use a mobility history list. An advantage of the CN node implementing this step is that it helps to reduce the paging-related signaling load in the network and reduce the demand for paging channel capacity on the radio interface while having a positive impact on the power consumption of the wireless device.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 1:
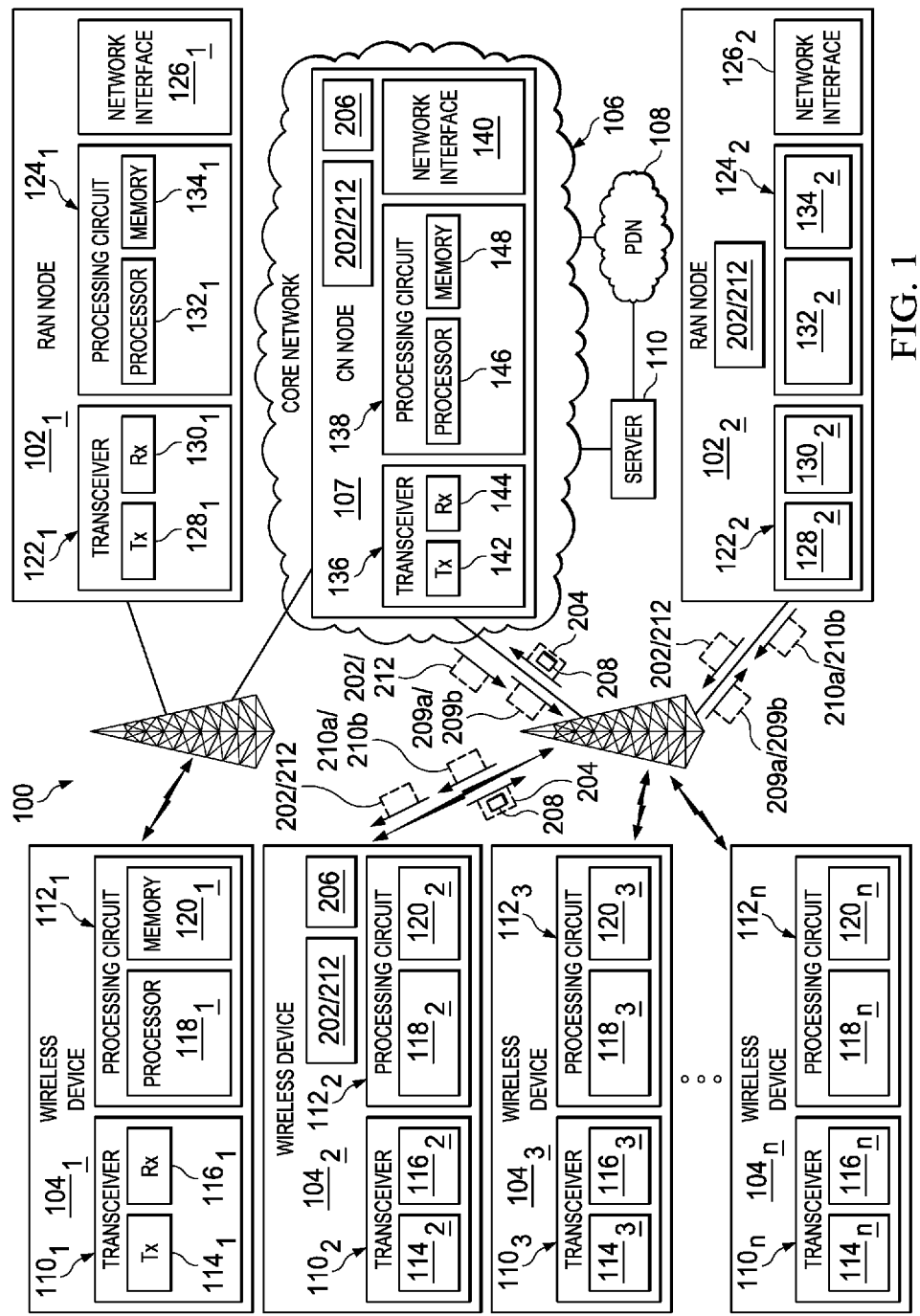
FIG. 1 is a diagram of an exemplary wireless communication network which includes a CN node, multiple RAN nodes, and multiple wireless devices which are all configured in accordance with an embodiment of the present disclosure.

A discussion is provided first herein to describe an exemplary wireless communication network that includes a CN node (e.g., SGSN, MME), multiple RAN nodes (e.g., BSSs, NodeBs, eNodeBs), and multiple wireless devices (e.g., MSs, UEs, MTC wireless devices, IoT devices, CIoT devices) all configured in accordance with an embodiment of the present disclosure (see FIG. 1). Then, a discussion is provided to disclose different techniques that the CN node, the RAN nodes, and the wireless devices can use to improve the mobility history mechanism in accordance with various embodiments of the present disclosure (see FIG. 2). Thereafter, a discussion is provided to explain the basic functionalities-configurations of the CN node, the RAN node, and the wireless device in accordance with different embodiments of the present disclosure (see FIGS. 3-8).

Exemplary Wireless Communication Network 100

Referring to FIG. 1, there is illustrated an exemplary wireless communication network 100 in accordance with the present disclosure. The wireless communication network 100 includes a core network 106 (which comprises at least one CN node 107) and multiple RAN nodes $102_1$ and $102_2$ (only two shown) which interface with multiple wireless devices $104_1$, $104_2$, $104_3$ ... $104_n$. The wireless communication network 100 also includes many well-known components, but for clarity, only the components needed to describe the features of the present disclosure are described herein. Further, the wireless communication network 100 is described herein as being a GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the RAN nodes $102_1$ and $102_2$ (wireless access nodes—only two shown) which provide network access to the wireless devices $104_1$, $104_2$, $104_3$ ... $104_n$. In this example, the RAN node $102_1$ is providing network access to wireless device $104_1$ while the RAN node $102_2$ is providing network access to wireless devices $104_2$, $104_3$ ... $104_n$. The RAN nodes $102_1$ and $102_2$ are connected to the core network 106 (e.g., SGSN core network 106) and, in particular, to the CN node 107 (e.g., SGSN 107). The core network 106 is connected to an external packet data network (PDN) 108, such as the Internet, and a server 110 (only one shown). The wireless devices $104_1$, $104_2$, $104_3$ ... $104_n$ may communicate with one or more servers 110 (only one shown) connected to the core network 106 and/or the PDN 108.

The wireless devices $104_1$, $104_2$, $104_3$ ... $104_n$ may refer generally to an end terminal (user) that attaches to the wireless communication network 100, and may refer to either a MTC device (e.g., a smart meter) or a non-MTC device. Further, the term "wireless device" is generally intended to be synonymous with the term mobile device, mobile station (MS), "User Equipment," or UE, as that term is used by 3GPP, and includes standalone wireless devices, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $102_1$ and $102_2$ (wireless access node $102_1$ and $102_2$) is used herein in the most general sense to refer to a base station, a wireless access node, or a wireless access point in a wireless communication network 100, and may refer to RAN nodes $102_1$ and $102_2$ that are controlled by a physically distinct radio network controller as well as to more autonomous access points, such as the so-called evolved Node Bs (eNodeBs) in Long-Term Evolution (LTE) networks.

Each wireless device $104_1$, $104_2$, $104_3$ ... $104_n$ may include a transceiver circuit $110_1$, $110_2$, $110_3$ ... $110_n$ for communicating with the RAN nodes $102_1$ and $102_2$, and a processing circuit $112_1$, $112_2$, $112_3$ ... $112_n$ for processing signals transmitted from and received by the transceiver circuit $110_1$, $110_2$, $110_3$ ... $110_n$ and for controlling the operation of the corresponding wireless device $104_1$, $104_2$, $104_3$ ... $104_n$. The transceiver circuit $110_1$, $110_2$, $110_3$ ... $110_n$ may include a transmitter $114_1$, $114_2$, $114_3$ ... $114_n$ and a receiver $116_1$, $116_2$, $116_3$ ... $116_n$, which may operate according to any standard, e.g., the GSM/EDGE standard. The processing circuit $112_1$, $112_2$, $112_3$ ... $112_n$ may include a processor $118_1$, $118_2$, $118_3$ ... $118_n$ and a memory $120_1$, $120_2$, $120_3$ ... $120_n$ for storing program code for controlling the operation of the corresponding wireless device $104_1$, $104_2$, $104_3$ ... $104_n$. The program code may include code for performing the procedures (e.g., determining/accessing/enabling/disabling/updating a setting associated with a mobility history list, receiving parameters comprising at least one threshold and/or at least one time period, detecting a present cell/network, determining that the present cell is not in a set of previous cells, determining that at least one condition is satisfied, performing a RAU procedure or a cell update, generating/updating a mobility history list, and transmitting at least one RAU request message or at least one cell update message comprising mobility history list information) as described hereinafter with respect to FIGS. 3-4.

Each RAN node $102_1$ and $102_2$ (wireless access node $102_1$ and $102_2$) may include a transceiver circuit $122_1$ and $122_2$ for communicating with wireless devices $104_1$, $104_2$, $104_3$ ... $104_n$, a processing circuit $124_1$ and $124_2$ for processing signals transmitted from and received by the transceiver circuit $122_1$ and $122_2$ and for controlling the operation of the corresponding RAN node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$, and a memory $134_1$ and $134_2$ for storing program code for controlling the operation of the corresponding RAN node $102_1$ and $102_2$. The program code may include code for performing the procedures (e.g., determining/receiving/accessing information about a network, setting/updating parameters comprising at least one threshold and/or at least one time period, transmitting/broadcasting the parameters comprising the at least one threshold and/or the at least one time period, receiving at least one RAU request message or at least one cell update message comprising mobility history list information, and generating/updating a mobility history list based at least in part on the mobility history list information of the received at least one RAU update message or the received at least one cell update message) as described hereinafter with respect to FIGS. 5-6.

The CN node 107 (e.g., SGSN 107, MME 107) may include a transceiver circuit 136 for communicating with the RAN nodes $102_1$ and $102_2$, a processing circuit 138 for processing signals transmitted from and received by the transceiver circuit 136 and for controlling the operation of the CN node 107, and a network interface 140 for communicating with the RAN nodes $102_1$ and $102_2$. The transceiver circuit 136 may include a transmitter 142 and a receiver 144, which may operate according to any standard, e.g., the GSM/EDGE standard. The processing circuit 138 may include a processor 146 and a memory 148 for storing program code for controlling the operation of the CN node 107. The program code may include code for performing the procedures as described hereinafter with respect to FIGS. 7-8.

Improved Mobility List Mechanism

An improved mobility history mechanism is described herein where the network (e.g., RAN node $102_2$, CN node 107) informs the wireless device $104_2$ (for example) about a threshold 202 concerning when the wireless device $104_2$ is qualified to make use of Cell Updates to generate (update) a mobility history list 206. The threshold 202 may describe, for example, the maximum number of cells that the wireless device $104_2$ is allowed to visit during a defined time period in order to qualify for transmitting mobility history information 208 to the network (i.e., the wireless device $104_2$ needs to first qualify (fulfill the threshold 202 conditions) before using the mobility history list 206) (note: this threshold 202 is referred to as the first threshold 202 in the next sentence). If desired, upon qualifying to send the mobility history list 206 according to the first threshold 202, another threshold 202 may define, for example, how many Cell Updates the wireless device $104_2$ may perform for updating the mobility history list 206 during another time period and thereby control how frequently the wireless device $104_2$ can send Cell Updates while it remains qualified to send mobility history lists 206 according to the first threshold 202.

For example, threshold(s) 202 could be based on one or more of the following, e.g., subscription, type of wireless device $104_2$, type of service supported by the wireless device $104_2$, whether the wireless device $104_2$ is roaming or not, an operator or Public Land Mobile Network (PLMN) in case of a shared network that the wireless device $104_2$ has selected for service. The threshold(s) 202 could also be based on, e.g., the traffic pattern for the specific wireless device $104_2$, where the traffic pattern is recorded either in the network or in the wireless device $104_2$ itself.

The threshold information 202 can be provided (transmitted) to the wireless device $104_2$ either by dedicated signaling (e.g., Non-Access Stratum (NAS) signaling from the CN node 107 or Access Stratum signaling from the RAN node $102_2$) or as part of system information (SI) on a broadcast channel from the RAN node $102_2$. The inclusion of the threshold information 202 in the SI could also serve to implicitly indicate that the network supports the use of a mobility history list 206. In yet another embodiment, the wireless device $104_2$ can be pre-configured with the necessary threshold information 202.

The network can update the threshold values 202 that the network transmitted to the wireless device $104_2$ based on, e.g., the load and/or congestion situation in the network. For example, the RAN node $102_2$ could use information from the CN node 107 about the start and/or end of an overload situation to update the threshold values.

In operation, the wireless device $104_2$ (for example) assuming it is capable of generating a mobility history list 206 (i.e., the wireless device $104_2$ supports the mobility history mechanism) can, based on the threshold information 202 received from the network or pre-configured therein, first determine if the wireless device $104_2$ qualifies to make use of the mobility history list 206. Once the wireless device $104_2$ affirmatively makes this determination, the wireless device $104_2$ can enable the use of the mobility history list mechanism the next time the wireless device $104_2$ contacts the network (e.g., during a RAU Request or a Cell Update) by including mobility history list information 208 in the message(s) 204 that the wireless device $104_2$ sends to the network. For instance, the wireless device $104_2$ may include in the sent message(s) 204 a list of the last-visited cells 208 which may be used as the current mobility history list 206 for the wireless device $104_2$.

As an option, the wireless device $104_2$ can be configured to always make use of the mobility history list 206, independent of the wireless device's mobility based threshold(s) 202. In this case, the wireless device $104_2$ will enable the use of the mobility history list 206 based on information provided to it when initially contacting the network after the wireless device $104_2$ powers on (e.g., the initial contact is performed using NAS signaling and results in identifying a subset of networks/PLMNs in which the use of the mobility history list 206 is always to be enabled regardless of threshold information 202 it may receive in cells associated with the identified networks/PLMNs). The configuration in the wireless device $104_2$ could then be based on, e.g., in what network/PLMN the wireless device $104_2$ is located. Thus, for example, the wireless device $104_2$ would use the mobility history list 206 in a certain network/PLMN, whereas the wireless device $104_2$ would use received threshold information 202 from the network (e.g., received in system information) in other networks/PLMNs to determine whether or not to use the mobility history list 206. The same principle could apply in order to configure the wireless device $104_2$ to never use the mobility history list 206 in a certain network/PLMN, whereas the wireless device $104_2$ would use received threshold information 202 from the network in other networks/PLMNs to determine whether or not to use the mobility history list 206. In yet another embodiment, the wireless device 104₂ that is known to be stationary can be configured to always make use of the mobility history list 206 since the wireless device 104₂ is known to have a limited mobility.

Figure 2:
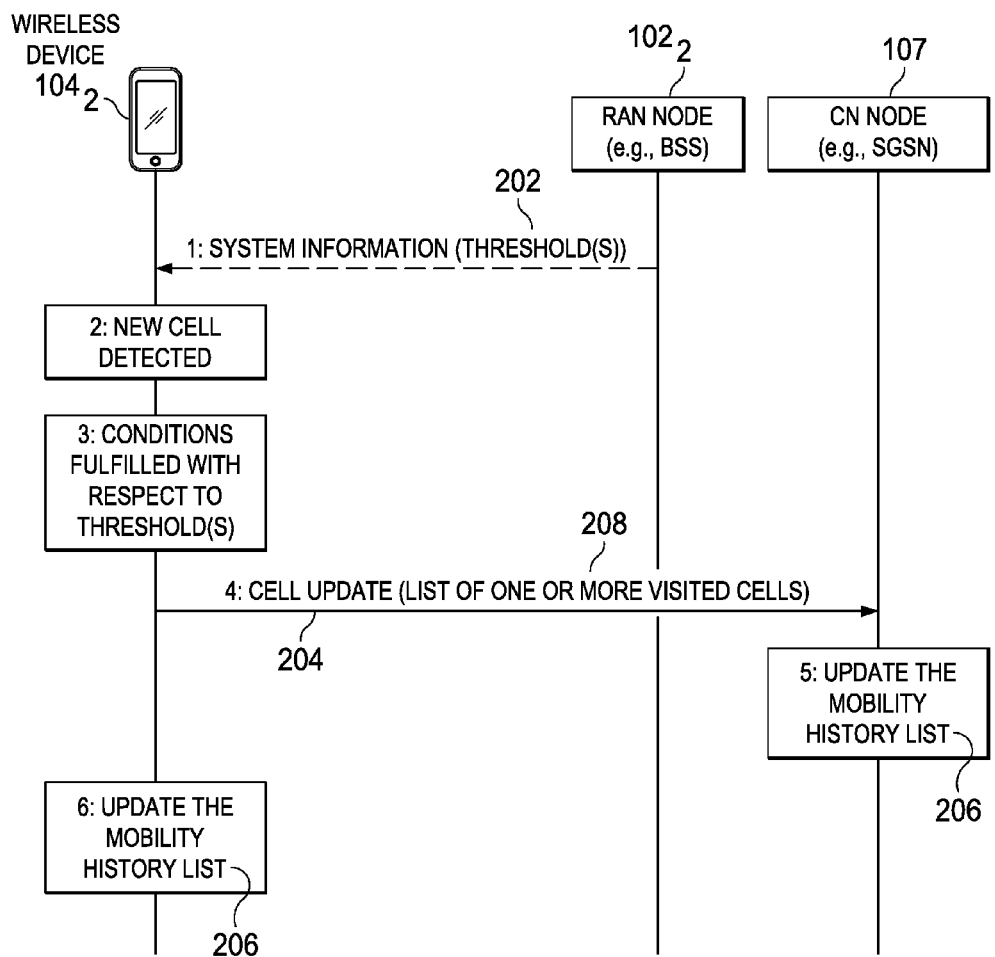
FIG. 2 is a signal diagram illustrating an example on how the wireless device can implement a new mobility history mechanism in accordance with an embodiment of the present disclosure.

Referring to FIG. 2, there is a signal diagram illustrating an example on how the wireless device 104₂ (for example) can implement the new mobility history mechanism in accordance with an embodiment of the present disclosure. The exemplary signal diagram has the following steps:

1. The RAN node 102₂ (e.g., BSS 102₂) transmits, in system information (SI) on the broadcast channel, threshold parameters 202 for when a wireless device 104₂ (for example) qualifies to make use of the Cell Update(s) 204 to generate (update) a mobility history list 206. Assuming that the wireless device 104₂ is capable of using the mobility history list mechanism then it acquires the threshold parameters 202.
2. The wireless device 104₂ detects a new cell, in which the wireless device 104₂ has not been located or on which the wireless device 104₂ has not been camped earlier.
3. The wireless device 104₂ determines that the wireless device 104₂ fulfills the conditions of the threshold parameters 202, as indicated in the SI, to make use of the Cell Update(s) 204 to generate (update) the mobility history list 206.
4. The wireless device 104₂ performs Cell Update(s) 204 to generate (update) the mobility history list 206 in the CN node 107 (e.g., SGSN 107). For example, the Cell Update(s) 204 include a list 208 of most recent cells visited by the wireless device 104₂. The most recent cells visited by the wireless device 104₂ can be, for example, the set of up to N cell(s) last visited for the case where the threshold information 202 allows for a maximum of N cell changes to be made in a defined time period, e.g., an hour. After sending a Cell Update 204 to provide the CN node 107 with mobility history list 206 information, if the wireless device 104₂ selects a new cell and determines that it still fulfills the conditions identified by the threshold parameters 202, then the wireless device 104₂ can send a further Cell Update 204, for example, one that only identifies the new cell as the only change from the list 208 of most recent visited cells included in the previous Cell Update 204.
5. The CN node 107 (e.g., SGSN 107) updates the mobility history list 206 for the wireless device 104₂ based on the received Cell Update(s) 204 (i.e., the list 208 of most recent visited cells).
6. The wireless device 104₂ updates the device's mobility history list 206 accordingly.

Basic Functionalities-Configurations of Wireless Device 104₂, RAN Node 102₂, and CN Node 107

Figure 3:
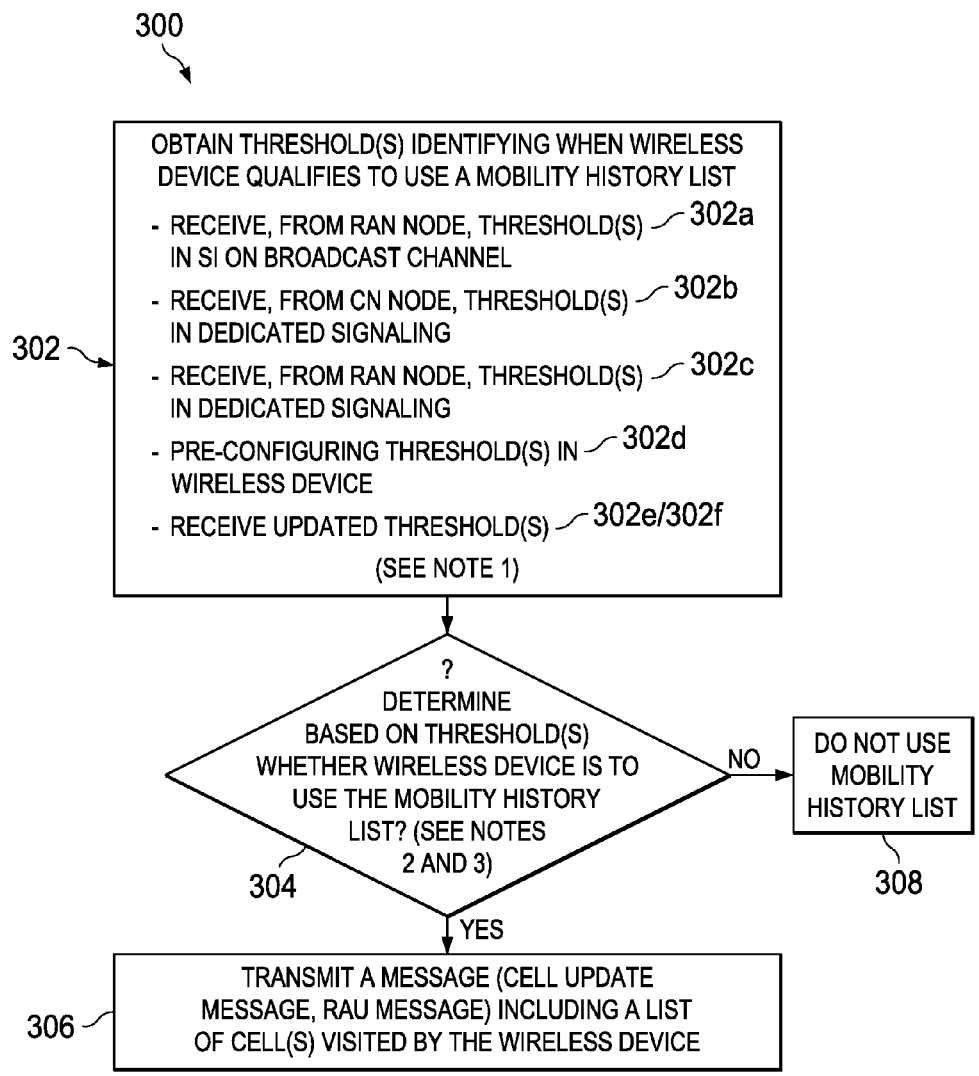
FIG. 3 is a flowchart of a method implemented in the wireless device in accordance with an embodiment of the present disclosure.

Referring to FIG. 3, there is a flowchart of a method 300 implemented in the wireless device 104₂ (for example) in accordance with an embodiment of the present disclosure. At step 302, the wireless device 104₂ obtains at least one threshold 202 identifying when the wireless device 104₂ qualifies to use a mobility history list 206. The threshold(s) 202 is/are typically related to the mobility of the wireless device 104₂. For example, the threshold(s) 202 may define the maximum number of cells that the wireless device 104₂ is allowed to visit during a defined time period in order to qualify for transmitting mobility history information 208 to the network (i.e., the wireless device 104₂ needs to first qualify (fulfill the conditions of the threshold 202) before using the mobility history mechanism). The threshold(s) 202 may be based on one or more of the following (for example): a subscription of the wireless device 104₂, a type of the wireless device 104₂, a type of service supported by the wireless device 104₂, whether the wireless device 104₂ is roaming or not, an operator or PLMN in a shared wireless communication network that the wireless device 104₂ has selected for service, and a traffic pattern of the wireless device 104₂.

The wireless device 104₂ can obtain the threshold(s) 202 in a variety of ways as follows (for example): (1) receiving, from the RAN node 102₂, the threshold(s) 202 in SI on a broadcast channel (step 302a); (2) receiving, from the CN node 107, the threshold(s) 202 in dedicated signaling (e.g. non-access stratum signaling) (step 302b); (3) receiving, from the RAN node 102₂, the threshold(s) in dedicated signaling (e.g., access stratum signaling) (step 302c); and (4) pre-configuring the threshold(s) 202 within the wireless device 104₂ (step 302d). In addition, the wireless device 104₂ can receive, from the RAN node 102₂, an update 210a to the threshold(s) 202 where the update 210a is based on a start of an overload situation in the wireless communication network 100 (step 302e). The wireless device 104₂ can also receive, from the RAN node 102₂, an update 210b to the threshold(s) 202 where the update 210b is based on an end of the overload situation in the wireless communication network 100 (step 302f).

At step 304, the wireless device 104₂ determines based on the threshold(s) 202 whether the wireless device 104₂ qualifies to use the mobility history list 206 (e.g., the wireless device 104₂ determines whether the condition(s) are fulfilled with respect to the parameters of the threshold(s) 202). For instance, the wireless device 104₂ is operable to perform the determine step 304 at power on or upon detecting a new cell. Further, the wireless device 104₂ can determine whether there is one or more exceptions 212 to using or not using the mobility history list 206 that is independent of whether or not the wireless device 104₂ qualifies based on the threshold(s) 202 to use the mobility history list 206. For instance, the exception(s) 212 to using the threshold(s) 202 can be one or more of the following: (1) the exception 212 is to use the mobility history list 206 while the wireless device 104₂ is located in a certain network, and when the wireless device 104₂ is located in other networks the wireless device 104₂ is to use the threshold(s) 202 to determine whether or not to use the mobility history list 206; (2) the exception 212 is to not use the mobility history list 206 while the wireless device 104₂ is located in a certain network, and when the wireless device 104₂ is located in other networks the wireless device 104₂ is to use the threshold(s) 202 to determine whether or not to use the mobility history list 206; and (3) the exception 212 is to use the mobility history list 206 when the wireless device 104₂ is known to be stationary. The wireless device 104₂ can receive the exception(s) 212 along with the threshold(s) 202 from the RAN node 102₂ or the CN node 107. Alternatively, the wireless device 104₂ can have the exception(s) 212 pre-configured therein.

Based on a determination in step 304 that the wireless device 104₂ is to use the mobility history list 206, the wireless device 104₂ at step 306 transmits a message 204 (e.g., Cell Update message 204, RAU message 204) to the CN node 107. The message 204 includes the list 208 of one or more cells visited by the wireless device 104₂ (i.e., the list 208 of last visited cells). The wireless device 104₂ and the CN node 107 will each update (or generate) the wireless device's mobility history list 206 based on the list 208 of last visited cells. On the other hand, if the wireless device 104₂ determines in step 304 that it is not to use the mobility history list 206, then the wireless device 104₂ at step 308 does not transmit a message 204 (e.g., Cell Update message 204, RAU message 204) including the list 208 of last visited cells to the CN node 107. It should be noted that the other wireless devices 104₁, 104₃ . . . 104ₙ may be configured in a similar manner to perform method 300 in the same manner as the wireless device 104₂.

Figure 4:
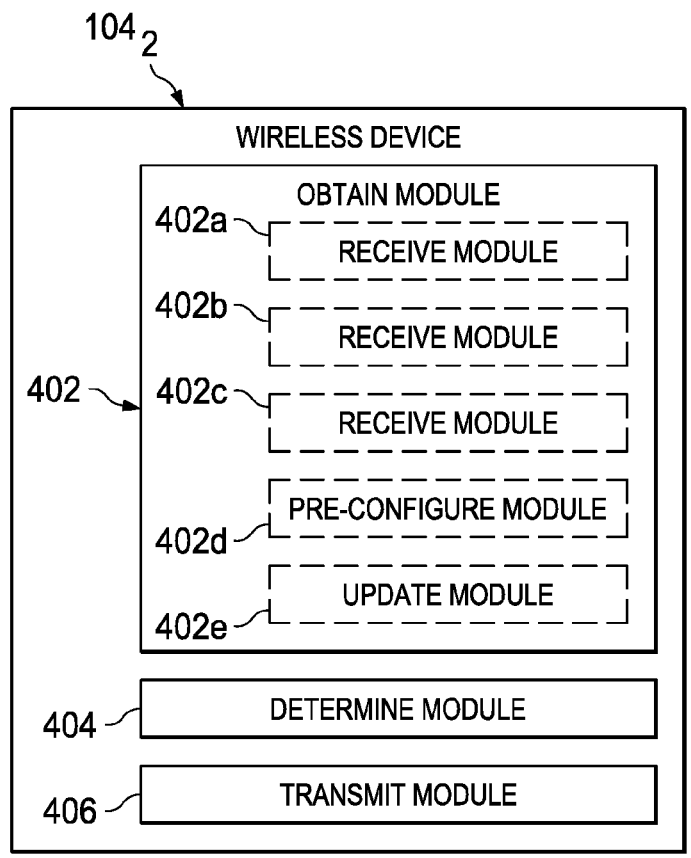
FIG. 4 is a block diagram illustrating an exemplary structure of the wireless device configured in accordance with an embodiment of the present disclosure.

Referring to FIG. 4, there is a block diagram illustrating structures of an exemplary wireless device 104₂ (for example) configured to interact with the RAN node 102₂ (e.g., BSS 102₂) and the CN node 107 (e.g., SGSN 107) in accordance with an embodiment of the present disclosure. In one embodiment, the wireless device 104₂ comprises an obtain module 402, a determine module 404, and a transmit module 406. The obtain module 402 is configured to obtain at least one threshold 202 identifying when the wireless device 104₂ qualifies to use a mobility history list 206. The threshold(s) 202 is/are typically related to the mobility of the wireless device 104₂. For example, the threshold(s) 202 may define the maximum number of cells that the wireless device 104₂ is allowed to visit during a defined time period in order to qualify for transmitting mobility history 206 to the network (i.e., the wireless device 104₂ needs to first qualify (fulfill the conditions of the threshold 202) before using the mobility history mechanism). The threshold(s) 202 may be based on one or more of the following (for example): a subscription of the wireless device 104₂, a type of the wireless device 104₂, a type of service supported by the wireless device 104₂, whether the wireless device 104₂ is roaming or not, an operator or PLMN in a shared wireless communication network that the wireless device 104₂ has selected for service, and a traffic pattern of the wireless device 104₂.

The obtain module 402 can obtain the threshold(s) 202 in a variety of ways as follows (for example): (1) receive, from the RAN node 102₂, the threshold(s) 202 in SI on a broadcast channel (receive module 402a); (2) receive, from the CN node 107, the threshold(s) 202 in dedicated signaling (e.g., non-access stratum signaling) (receive module 402b); (3) receive, from the RAN node 102₂, the threshold(s) in dedicated signaling (e.g., access stratum signaling) (receive module 402c); and (4) pre-configure the threshold(s) 202 within the wireless device 104₂ (pre-configure module 402d). In addition, the obtain module 402 can receive, from the RAN node 102₂, an update 210a to the threshold(s) 202 where the update 210a is based on a start of an overload situation in the wireless communication network 100 (update module 402e). The obtain module 402 can also receive, from the RAN node 102₂, an update 210b to the threshold(s) 202 where the update 210b is based on an end of the overload situation in the wireless communication network 100 (update module 402e).

The determine module 404 is configured to determine based on the threshold(s) 202 whether the wireless device 104₂ qualifies to use the mobility history list 206 (e.g., the determine module 404 determines whether the condition(s) are fulfilled with respect to the parameters of the threshold(s) 202). For instance, the determine module 404 is operable to perform the determine operation at power on or upon detecting a new cell. Further, the determine module 404 can determine whether there is one or more exceptions 212 to using or not using the mobility history list 206 that is independent of whether or not the wireless device 104₂ qualifies based on the threshold(s) 202 to use the mobility history list 206. For instance, the exception(s) 212 to using the threshold(s) 202 can be one or more of the following: (1) the exception 212 is to use the mobility history list 206 while the wireless device 104₂ is located in a certain network, and when the wireless device 104₂ is located in other networks the wireless device 104₂ is to use the threshold(s) 202 to determine whether or not to use the mobility history list 206; (2) the exception 212 is to not use the mobility history list 206 while the wireless device 104₂ is located in a certain network, and when the wireless device 104₂ is located in other networks the wireless device 104₂ is to use the threshold(s) 202 to determine whether or not to use the mobility history list 206; and (3) the exception 212 is to use the mobility history list 206 when the wireless device 104₂ is known to be stationary. The obtain module 402 can receive the exception(s) 212 along with the threshold(s) 202 from the RAN node 102₂ or the CN node 107. Alternatively, the obtain module 402 can have the exception(s) 212 pre-configured therein.

Based on the determination module 404 determining that the wireless device 104₂ is to use the mobility history list 206, the transmit module 406 is configured to transmit a message 204 (e.g., Cell Update message 204, RAU message 204) to the CN node 107. The message 204 includes the list 208 of one or more cells visited by the wireless device 104₂ (i.e., the list 208 of last visited cells). On the other hand, if the determination module 404 determines that the wireless device 104₂ is not to use the mobility history list 206, then the wireless device 104₂ does not transmit a message 204 (e.g., Cell Update message 204, RAU message 204) including the list 208 of last visited cells to the CN node 107. It should be noted that the wireless device 104₂ may also include other components, modules or structures which are well-known, but for clarity, only the components, modules or structures needed to describe the features of the present disclosure are described herein. Further, it should be noted that the other wireless devices 104₁, 104₃ . . . 104ₙ may be configured in a similar manner as the wireless device 104₂.

As those skilled in the art will appreciate, the above-described modules 402, 404, and 406 of the wireless device 104₂ may be implemented separately with suitable dedicated circuits. Further, the modules 402, 404, and 406 can also be implemented using any number of dedicated circuits through functional combination or separation. In some embodiments, the modules 402, 404, and 406 may be even combined in a single application specific integrated circuit (ASIC). As an alternative software-based implementation, the wireless device 104₂ may comprise a memory 120₂, a processor 118₂ (including but not limited to a microprocessor, a microcontroller or a Digital Signal Processor (DSP), etc.) and a transceiver 110₂. The memory 120₂ stores machine-readable program code executable by the processor 118₂ to cause the wireless device 104₂ to perform the steps of the above-described method 300.

Figure 5:
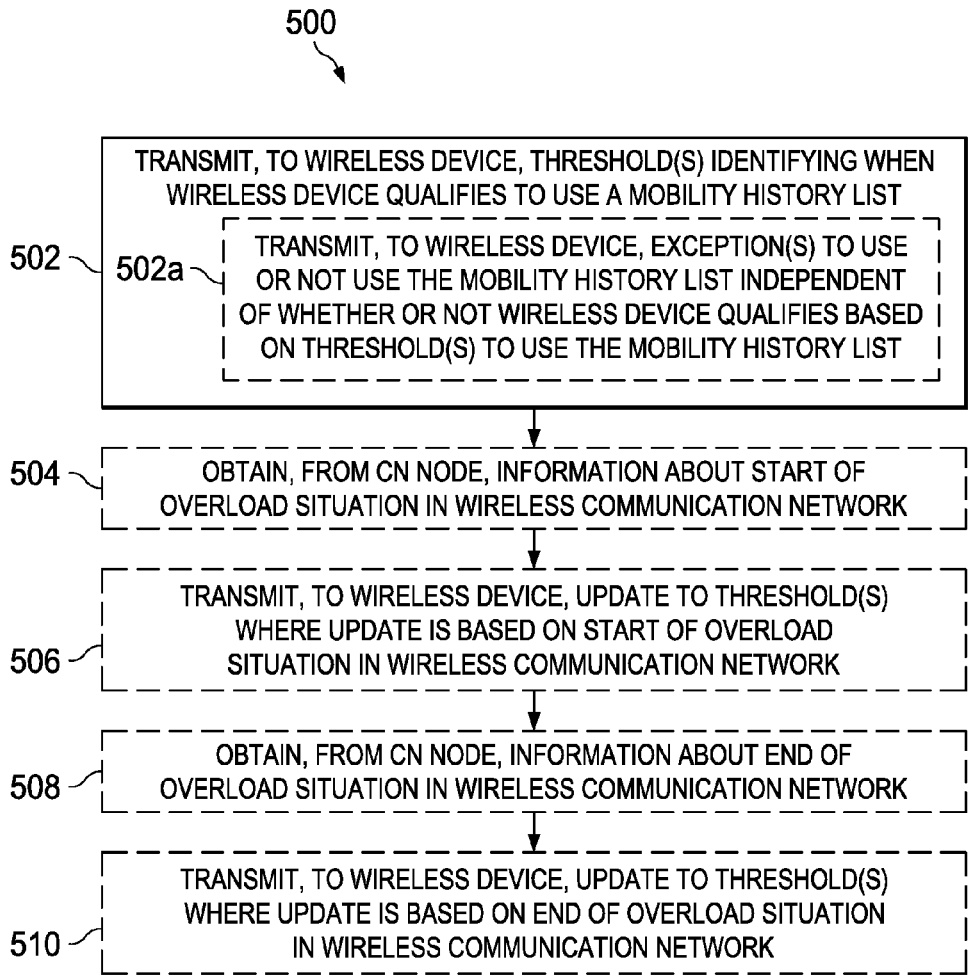
FIG. 5 is a flowchart of a method implemented in the RAN node in accordance with an embodiment of the present disclosure.

Referring to FIG. 5, there is a flowchart of a method 500 implemented in the RAN node 102₂ (e.g., BSS 102₂) in accordance with an embodiment of the present disclosure. At step 502, the RAN node 102₂ transmits to the wireless device 104₂ at least one threshold 202 concerning when the wireless device 104₂ qualifies to use a mobility history list 206. The threshold(s) 202 is/are typically related to the mobility of the wireless device 104₂. For example, the threshold(s) 202 may define the maximum number of cells that the wireless device 104₂ is allowed to visit during a defined time period in order to qualify for transmitting mobility history information 208 to the network (i.e., the wireless device 104₂ needs to first qualify (fulfill the conditions of the threshold 202) before using the mobility history mechanism). The threshold(s) 202 may be based on one or more of the following (for example): a subscription of the wireless device $104_2$, a type of the wireless device $104_2$, a type of service supported by the wireless device $104_2$, whether the wireless device $104_2$ is roaming or not, an operator or PLMN in a shared wireless communication network that the wireless device $104_2$ has selected for service, and a traffic pattern of the wireless device $104_2$.

If desired, the RAN node $102_2$ at step 502a can also transmit along with the threshold(s) 202 one or more exceptions 212 to using or not using the mobility history list 206 independent of whether or not the wireless device $104_2$ qualifies based on the threshold(s) 202 to use the mobility history list 206. For instance, the exception(s) 212 to using the threshold(s) 202 can be one or more of the following: (1) the exception 212 is to use the mobility history list 206 while the wireless device $104_2$ is located in a certain network, and when the wireless device $104_2$ is located in other networks the wireless device $104_2$ is to use the threshold(s) 202 to determine whether or not to use the mobility history list 206; (2) the exception 212 is to not use the mobility history list 206 while the wireless device $104_2$ is located in a certain network, and when the wireless device $104_2$ is located in other networks the wireless device $104_2$ is to use the threshold(s) 202 to determine whether or not to use the mobility history list 206; and (3) the exception 212 is to use the mobility history list 206 when the wireless device $104_2$ is known to be stationary. The RAN node $102_2$ can transmit the threshold(s) 202 and the exception(s) 212 (if any) to the wireless device $104_2$ by using SI on a broadcast channel, or by using dedicated signaling (e.g., access stratum signaling).

At step 504, the RAN node $102_2$ can obtain, from the CN node 107, information 209a about a start of an overload situation in the wireless communication network 100. At step 506, the RAN node $102_2$ can transmit, to the wireless device $104_2$, an update 210a to the threshold(s) 202, where the update 210a is based on the start of the overload situation in the wireless communication network 100. At step 508, the RAN node $102_2$ can obtain, from the CN node 107, information 209b about an end of the overload situation in the wireless communication network 100. At step 510, the RAN node $102_2$ can transmit, to the wireless device $104_2$, an update 210b to the threshold(s) 202 where the update 210b is based on the end of the overload situation in the wireless communication network 100. In the event, that the wireless device $104_2$ is pre-configured to have the threshold(s) and/or the exception(s) 212 stored therein then the RAN node $102_2$ may not need to perform step 502 but could still perform steps 504, 506, 508, and 510. It should be noted that the other RAN node $102_1$ may be configured to implement method 500 in the same manner as the RAN node $102_2$.

Figure 6:
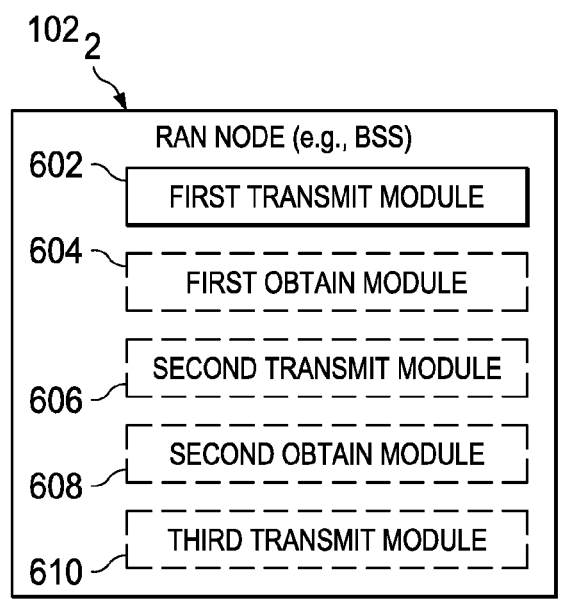
FIG. 6 is a block diagram illustrating an exemplary structure of the RAN node configured in accordance with an embodiment of the present disclosure.

Referring to FIG. 6, there is a block diagram illustrating structures of an exemplary RAN node $102_2$ (e.g., BSS $102_2$) configured to interact with the wireless device $104_2$ (for example) and the CN node 107 (e.g., SGSN 107) in accordance with an embodiment of the present disclosure. In one embodiment, the RAN node $102_2$ comprises a first transmit module 602, a first obtain module 604, a second transmit module 606, a second obtain module 608, and a third transmit module 610. The first transmit module 602 is configured to transmit to the wireless device $104_2$ at least one threshold 202 concerning when the wireless device $104_2$ qualifies to use a mobility history list 206. The threshold(s) 202 is/are typically related to the mobility of the wireless device $104_2$. For example, the threshold(s) 202 may define the maximum number of cells that the wireless device $104_2$ is allowed to visit during a defined time period in order to qualify for transmitting mobility history information 208 to the network (i.e., the wireless device $104_2$ needs to first qualify (fulfill conditions of the threshold 202) before using the mobility history mechanism). The threshold(s) 202 may be based on one or more of the following (for example): a subscription of the wireless device $104_2$, a type of the wireless device $104_2$, a type of service supported by the wireless device $104_2$, whether the wireless device $104_2$ is roaming or not, an operator or PLMN in a shared wireless communication network that the wireless device $104_2$ has selected for service, and a traffic pattern of the wireless device $104_2$.

If desired, the first transmit module 602 can be configured to transmit along with the threshold(s) 202 one or more exceptions 212 to using or not using the mobility history list 206 independent of whether or not the wireless device $104_2$ qualifies based on the threshold(s) 202 to use the mobility history list 206. For instance, the exception(s) 212 to using the threshold(s) 202 can be one or more of the following: (1) the exception 212 is to use the mobility history list 206 while the wireless device $104_2$ is located in a certain network, and when the wireless device $104_2$ is located in other networks the wireless device $104_2$ is to use the threshold(s) 202 to determine whether or not to use the mobility history list 206; (2) the exception 212 is to not use the mobility history list 206 while the wireless device $104_2$ is located in a certain network, and when the wireless device $104_2$ is located in other networks the wireless device $104_2$ is to use the threshold(s) 202 to determine whether or not to use the mobility history list 206; and (3) the exception 212 is to use the mobility history list 206 when the wireless device $104_2$ is known to be stationary. The first transmit module 602 can transmit the threshold(s) 202 and the exception(s) 212 (if any) to the wireless device $104_2$ by using SI on a broadcast channel, or by using dedicated signaling (e.g., access stratum signaling).

The first obtain module 604 can be configured to obtain, from the CN node 107, information 209a about a start of an overload situation in the wireless communication network 100. The second transmit module 606 can be configured to transmit, to the wireless device $104_2$, an update 210a to the threshold(s) 202, where the update 210a is based on the start of the overload situation in the wireless communication network 100. The second obtain module 608 can be configured to obtain, from the CN node 107, information 209b about an end of the overload situation in the wireless communication network 100. The third transmit module 610 can be configured to transmit, to the wireless device $104_2$, an update 210b to the threshold(s) 202 where the update 210b is based on the end of the overload situation in the wireless communication network 100. It should be noted that the RAN node $102_2$ may also include other components, modules or structures which are well-known, but for clarity, only the components, modules or structures needed to describe the features of the present disclosure are described herein. Further, it should be noted that the other RAN node $102_1$ may be configured in a similar manner as the RAN node $102_2$.

As those skilled in the art will appreciate, the above-described modules 602, 604, 606, 608, and 610 of the RAN node $102_2$ (e.g., BSS $102_2$, NodeB $102_2$, eNodeB $102_2$) may be implemented separately with suitable dedicated circuit(s). Further, the modules 602, 604, 606, 608, and 610 can also be implemented using any number of dedicated circuits through functional combination or separation. In some embodiments, the modules 602, 604, 606, 608, and 610 may be even combined in a single application specific integrated circuit (ASIC). As an alternative software-based implementation, the RAN node $102_2$ may comprise a memory $134_2$, a processor $132_2$ (including but not limited to a microprocessor, a microcontroller or a Digital Signal Processor (DSP), etc.) and a transceiver $122_2$. The memory $134_2$ stores machine-readable program code executable by the processor $132_2$ to cause the RAN node $102_2$ (e.g., BSS $102_2$, NodeB $102_2$, eNodeB $102_2$) to perform the steps of the above-described method 500. It should be appreciated that the other RAN node $102_1$ can also be configured in a similar manner as the RAN node $102_2$ to perform method 500.

Figure 7:
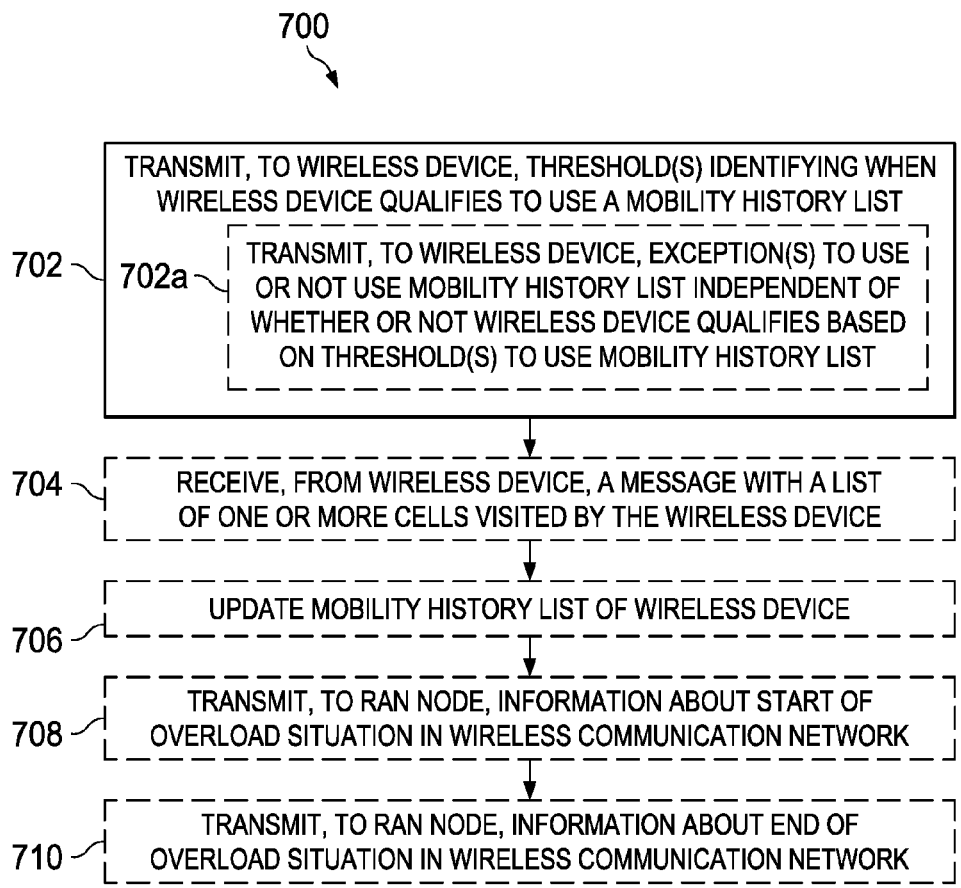
FIG. 7 is a flowchart of a method implemented in the CN node in accordance with an embodiment of the present disclosure.

Referring to FIG. 7, there is a flowchart of a method 700 implemented in the CN node 107 (e.g., SGSN 107) in accordance with an embodiment of the present disclosure. At step 702, the CN node 107 transmits to the wireless device $104_2$ at least one threshold 202 concerning when the wireless device $104_2$ qualifies to use a mobility history list 206. The threshold(s) 202 is/are typically related to the mobility of the wireless device $104_2$. For example, the threshold(s) 202 may define the maximum number of cells that the wireless device $104_2$ is allowed to visit during a defined time period in order to qualify for transmitting mobility history information 208 to the network (i.e., the wireless device $104_2$ needs to first qualify (fulfill conditions the threshold 202) before using the mobility history mechanism). The threshold(s) 202 may be based on one or more of the following (for example): a subscription of the wireless device $104_2$, a type of the wireless device $104_2$, a type of service supported by the wireless device $104_2$, whether the wireless device $104_2$ is roaming or not, an operator or PLMN in a shared wireless communication network that the wireless device $104_2$ has selected for service, and a traffic pattern of the wireless device $104_2$.

If desired, the CN node 107 at step 702a can also transmit along with the threshold(s) 202 one or more exceptions 212 to using or not using the mobility history list 206 independent of whether or not the wireless device $104_2$ qualifies based on the threshold(s) 202 to use the mobility history list 206. For instance, the exception(s) 212 to using the threshold(s) 202 can be one or more of the following: (1) the exception 212 is to use the mobility history list 206 while the wireless device $104_2$ is located in a certain network, and when the wireless device $104_2$ is located in other networks the wireless device $104_2$ is to use the threshold(s) 202 to determine whether or not to use the mobility history list 206; (2) the exception 212 is to not use the mobility history list 206 while the wireless device $104_2$ is located in a certain network, and when the wireless device $104_2$ is located in other networks the wireless device $104_2$ is to use the threshold(s) 202 to determine whether or not to use the mobility history list 206; and (3) the exception 212 is to use the mobility history list 206 when the wireless device $104_2$ is known to be stationary. The CN node 107 can transmit the threshold(s) 202 and the exception(s) 212 (if any) to the wireless device $104_2$ by using dedicated signaling (e.g., non-access stratum signaling).

At step 704, the CN node 107 receives, from the wireless device $104_2$, a message 204 (e.g., Cell Update message 204, RAU message 204) which includes the list 208 of one or more cells visited by the wireless device $104_2$ (i.e., the list 208 of last visited cells). At step 706, the CN node 107 updates (or generates) the wireless device's mobility history list 206 based on the list 208 of one or more cells visited by the wireless device $104_2$ (note: the receiving step 704 and updating step 706 assumes that the wireless device $104_2$ has determined that it is qualified in view of the threshold(s) 202 and exception(s) 212 (if any) to use the mobility history list 206).

At step 708, the CN node 107 can transmit to the RAN node $102_2$ information 209a about a start of an overload situation in the wireless communication network 100. At step 710, the CN node 107 can transmit to the RAN node $102_2$ information 209b about an end of the overload situation in the wireless communication network 100. It should be appreciated that the CN node 107 can perform steps 708 and 710 at any time after step 702. In the event, that the wireless device $104_2$ is pre-configured to have the threshold(s) and/or the exception(s) 212 stored therein then the CN node 107 may not need to perform step 702 but could still perform steps 704, 706, 708, and 710.

Figure 8:
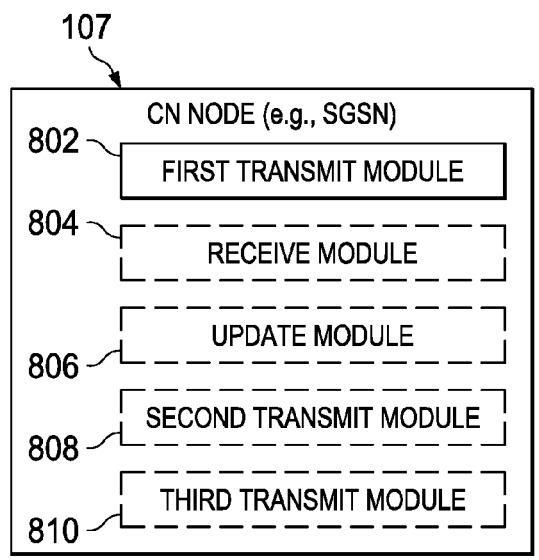
FIG. 8 is a block diagram illustrating an exemplary structure of the CN node configured in accordance with an embodiment of the present disclosure.

Referring to FIG. 8, there is a block diagram illustrating structures of an exemplary CN node 107 (e.g., SGSN 107) configured to interact with the wireless device $104_2$ (for example) and the RAN node $102_2$ (e.g., BSS $102_2$, NodeB $102_2$, eNodeB $102_2$) in accordance with an embodiment of the present disclosure. In one embodiment, the CN node 107 comprises a first transmit module 802, a receive module 804, an update module 806, a second transmit module 808, and a third transmit module 810. The first transmit module 802 is configured to transmit to the wireless device $104_2$ at least one threshold 202 concerning when the wireless device $104_2$ qualifies to use a mobility history list 206. The threshold(s) 202 is/are typically related to the mobility of the wireless device $104_2$. For example, the threshold(s) 202 may define the maximum number of cells that the wireless device $104_2$ is allowed to visit during a defined time period in order to qualify for transmitting mobility history information 208 to the network (i.e., the wireless device $104_2$ needs to first qualify (fulfill conditions of the threshold 202) before using the mobility history mechanism). The threshold(s) 202 may be based on one or more of the following (for example): a subscription of the wireless device $104_2$, a type of the wireless device $104_2$, a type of service supported by the wireless device $104_2$, whether the wireless device $104_2$ is roaming or not, an operator or PLMN in a shared wireless communication network that the wireless device $104_2$ has selected for service, and a traffic pattern of the wireless device $104_2$.

If desired, the first transmit module 802 can also be configured to transmit along with the threshold(s) 202 one or more exceptions 212 to using or not using the mobility history list 206 independent of whether or not the wireless device $104_2$ qualifies based on the threshold(s) 202 to use the mobility history list 206. For instance, the exception(s) 212 to using the threshold(s) 202 can be one or more of the following: (1) the exception 212 is to use the mobility history list 206 while the wireless device $104_2$ is located in a certain network, and when the wireless device $104_2$ is located in other networks the wireless device $104_2$ is to use the threshold(s) 202 to determine whether or not to use the mobility history list 206; (2) the exception 212 is to not use the mobility history list 206 while the wireless device $104_2$ is located in a certain network, and when the wireless device $104_2$ is located in other networks the wireless device $104_2$ is to use the threshold(s) 202 to determine whether or not to use the mobility history list 206; and (3) the exception 212 is to use the mobility history list 206 when the wireless device $104_2$ is known to be stationary. The first transmit module 802 can transmit the threshold(s) 202 and the exception(s) 212 (if any) to the wireless device $104_2$ by using dedicated signaling (e.g., non-access stratum signaling).

The receive module 804 is configured to receive, from the wireless device $104_2$, a message 204 (e.g., Cell Update message 204, RAU message 204) which includes the list 208 of one or more cells visited by the wireless device 104₂ (i.e., the list 208 of last visited cells). The update module 806 is configured to update (or generate) the wireless device's mobility history list 206 based on the list 208 of one or more cells visited by the wireless device 104₂. The second transmit module 808 is configured to transmit to the RAN node 102₂ information 209a about a start of an overload situation in the wireless communication network 100. The third transmit module 810 is configured to transmit the RAN node 102₂ information 209b about an end of the overload situation in the wireless communication network 100. It should be noted that the CN node 107 may also include other components, modules or structures which are well-known, but for clarity, only the components, modules or structures needed to describe the features of the present disclosure are described herein.

As those skilled in the art will appreciate, the above-described modules 802, 804, 806, 808, and 810 of the CN node 107 (e.g., SGSN 107) may be implemented separately by suitable dedicated circuit(s). Further, the modules 802, 804, 806, 808, and 810 can also be implemented using any number of dedicated circuits through functional combination or separation. In some embodiments, the modules 802, 804, 806, 808, and 810 may be even combined in a single application specific integrated circuit (ASIC). As an alternative software-based implementation, the CN node 107 may comprise a memory 148, a processor 146 (including but not limited to a microprocessor, a microcontroller or a Digital Signal Processor (DSP), etc.) and a transceiver 136. The memory 148 stores machine-readable program code executable by the processor 146 to cause the CN node 107 (e.g., SGSN 107) to perform the steps of the above-described method 700.

In view of the foregoing, one skilled in the art will appreciate that the present disclosure introduces a new mechanism whereby the network (e.g., RAN node 102₂, CN node 107) informs a wireless device 104₂ (for example) about threshold(s) 202 that need to be satisfied for the wireless device 104₂ to qualify for using the mobility history list 206, and the wireless device 104₂ therefore only conveys mobility history information 208 to the network when the wireless device 104₂ has met the qualifications of the threshold(s) 202 and the exception(s) 212 if any thereto. The present disclosure has several advantages some of which are as follows: (1) the paging-related signaling load in the network is substantially reduced, thereby providing networks with a greater signaling capacity for paging wireless devices 104₁, 104₂, 104₃ ... 104ₙ; and (2) there is a positive impact on the power consumption of the wireless devices 104₁, 104₂, 104₃ ... 104ₙ and the availability of packet channel resources in the network.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A wireless device configured to interact with a radio access network (RAN) node and a core network (CN) node, the wireless device comprising:
    a processor; and,
    a memory that stores processor-executable instructions, wherein the processor interfaces with the memory to execute the processor-executable instructions, whereby the wireless device is operable to:
        obtain at least one threshold identifying when the wireless device qualifies to use a mobility history list, wherein the obtain operation further comprises:
            receiving, from the RAN node, an update to the at least one threshold where the update is based on a start of an overload situation in a wireless communication network; and
            receiving, from the RAN node, another update to the at least one threshold where the another update is based on an end of the overload situation in the wireless communication network;
        determine based on the at least one threshold whether the wireless device qualifies to use the mobility history list; and
        based on a determination that the wireless device is to use the mobility history list, transmit a message including a list of one or more cells visited by the wireless device.

2. The wireless device of claim 1, wherein the obtain operation further comprises at least one of the following:
    receiving, from the RAN node, the at least one threshold in System Information (SI) on a broadcast channel;
    receiving, from the CN node, the at least one threshold in dedicated signaling;
    receiving, from the RAN node, the at least one threshold in dedicated signaling; and
    pre-configuring the at least one threshold within the wireless device.

3. The wireless device of claim 1, wherein the wireless device is operable to perform the determine operation at power on or upon detecting a new cell.

4. The wireless device of claim 1, wherein the determine operation further comprises:
   determining whether there is an exception to using or not using the mobility history list independent of whether or not the wireless device qualifies based on the at least one threshold to use the mobility history list.

5. A method in a wireless device configured to interact with a radio access network (RAN) node and a core network (CN) node, the method comprising:
   obtaining at least one threshold identifying when the wireless device qualifies to use a mobility history list, wherein the obtaining step further comprises:
      receiving, from the RAN node, an update to the at least one threshold where the update is based on a start of an overload situation in a wireless communication network; and
      receiving, from the RAN node, another update to the at least one threshold where the another update is based on an end of the overload situation in the wireless communication network;
   determining based on the at least one threshold whether the wireless device qualifies to use the mobility history list; and
   based on a determination that the wireless device is to use the mobility history list, transmitting a message including a list of one or more cells visited by the wireless device.

6. The method of claim 5, wherein the obtaining step further comprises at least one of the following:
   receiving, from the RAN node, the at least one threshold in System Information (SI) on a broadcast channel;
   receiving, from the CN node, the at least one threshold in dedicated signaling;
   receiving, from the RAN node, the at least one threshold in dedicated signaling; and
   pre-configuring the at least one threshold within the wireless device.

7. The method of claim 5, wherein the wireless device is operable to perform the determining step at power on or upon detecting a new cell.

8. The method of claim 5, wherein the determining step further comprises:
   determining whether there is an exception to using or not using the mobility history list independent of whether or not the wireless device qualifies based on the at least one threshold to use the mobility history list.

* * * * *